US012635626B2

(12) United States Patent | (10) Patent No.: US 12,635,626 B2
--- | ---
Dillon | (45) Date of Patent: May 26, 2026

(54) CABLE AND TROLLEY SYSTEM FOR USE WITHIN AN IRRIGATION SPAN ASSEMBLY

(71) Applicant: Valmont Industries, Inc., Omaha, NE (US)

(72) Inventor: Cory J. Dillon, Bennington, NE (US)

(73) Assignee: Valmont Industries, Inc., Omaha, NE (US)

( * ) Notice: Subject to any disclaimer, the term of this patent is extended or adjusted under 35 U.S.C. 154(b) by 133 days.

(21) Appl. No.: 18/583,035

(22) Filed: Feb. 21, 2024

(65) Prior Publication Data

US 2024/0298584 A1 Sep. 12, 2024

Related U.S. Application Data

(60) Provisional application No. 63/489,008, filed on Mar. 8, 2023.

(51) Int. Cl.
A01G 25/09 (2006.01)
A01G 25/16 (2006.01)

(52) U.S. Cl.
CPC ........... A01G 25/095 (2013.01); A01G 25/16 (2013.01); A01G 25/09 (2013.01); A01G 25/092 (2013.01); A01G 25/097 (2013.01)

(58) Field of Classification Search
CPC .... A01G 25/095; A01G 25/09; A01G 25/097; A01G 25/16; A01G 25/092

USPC ........ 239/723, 728, 729, 730–733, 741, 742
See application file for complete search history.

(56) References Cited

U.S. PATENT DOCUMENTS

| | | | | |
|---|---|---|---|---|
| 2,889,948 | A | * 6/1959 | Leuenberger | .......... A01G 25/09 |
| | | | | 414/800 |
| 4,184,639 | A | 1/1980 | Miller | |
| 4,230,272 | A | * 10/1980 | Snell | ..................... A01M 7/005 |
| | | | | 239/164 |
| 5,927,603 | A | * 7/1999 | McNabb | .............. A01G 25/167 |
| | | | | 239/69 |
| 2019/0008101 | A1 | * 1/2019 | Teeter | .................. A01G 25/092 |
| 2022/0117152 | A1 | 4/2022 | Ma | |

OTHER PUBLICATIONS

International Application No. PCT/US24/1664, International Search Report and Written Opinion mailed Jun. 14, 2024, 9 pages.

* cited by examiner

*Primary Examiner* — Thomas P Burke
(74) *Attorney, Agent, or Firm* — Milligan PC LLO

(57) ABSTRACT

A sensor and spray cable system to provide irrigation and crop treatments to targeted areas beneath and around an irrigation machine. According to a first preferred embodiment, the present invention includes one or more irrigation trolleys which are propelled with and/or along one or more transport cables. The irrigation trolleys include controllers, sensors and irrigation sprayers which work together to apply applicants to discrete areas of a given field.

23 Claims, 6 Drawing Sheets

1

CABLE AND TROLLEY SYSTEM FOR USE WITHIN AN IRRIGATION SPAN ASSEMBLY

RELATED APPLICATIONS

The present application claims priority to U.S. Provisional Application No. 63/489,008 filed on Mar. 8, 2023.

FIELD OF THE PRESENT INVENTION

The present invention relates generally to an irrigation spray system. More particularly, the present invention provides a sensor and spray cable system for use within an irrigation span assembly.

BACKGROUND OF THE INVENTION

Modern irrigation systems include interconnected irrigation spans (i.e., spans) and drive towers that support and move the connected spans. The spans in turn support sprinkler systems that spray water (or other applicants) in desired patterns.

Individual spans often extend to lengths 100-200 feet, with overall irrigation machine lengths extending up to 2500-3000 feet. With their large machine lengths, it is often difficult for modern irrigation machines to efficiently irrigate the entire length of crops that the irrigation machine extends across. To properly irrigate such lengths, it is common for irrigation machines to include significant numbers of nozzles and sprayers. An important limitation of such irrigation machines is the need for the irrigation machine to irrigate an entire span of crops the same way with the same applicant. This arrangement restricts the ability to target any specific plant or group with individualized treatments or specialized amounts of applicants.

To overcome the limitations of the prior art, a reliable and effective system is needed to allow for the specific spraying and treatment of precise areas of a given field.

SUMMARY OF THE DISCLOSURE

To minimize the limitations found in the prior art and other limitations that will be apparent upon the reading of the specification, preferred embodiments of the present invention include a system and apparatus for providing irrigation and crop treatments to targeted areas beneath and around an irrigation machine.

According to a first preferred embodiment, the present invention includes one or more irrigation trolleys that are propelled with and/or along one or more transport cables. The irrigation trolleys preferably include controllers, sensors, and irrigation sprayers which work together to apply applicants to discrete areas of a given field. Such discrete areas may be identified in a variable irrigation rate prescription. Still, further, the trolleys of the present invention may (independently or in concert with the system controller) scan, analyze, and apply selected applicants to given areas based on detected environmental or crop-related characteristics.

According to further preferred embodiments, the system of the present invention preferably includes a first securing element for attachment to a first drive tower which includes a first central securing element, a first top pulley, and a first bottom pulley. The preferred system preferably further includes a first drive element for driving the lateral movement of a secured trolley along one or more transport cables.

According to further preferred embodiments, at least one of the transport cables may preferably be a braided cable which is formed from a group of cables that are braided to form a single braided cable. The braided cable may preferably further include a central hollow tube which is configured to allow for the transport of an applicant down to the sprayers of one or more of the secured trolleys.

These and other advantages and features of the present invention are described with specificity to make the present invention understandable to one of ordinary skill in the art.

BRIEF DESCRIPTION OF THE DRAWINGS

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

Figure 1:
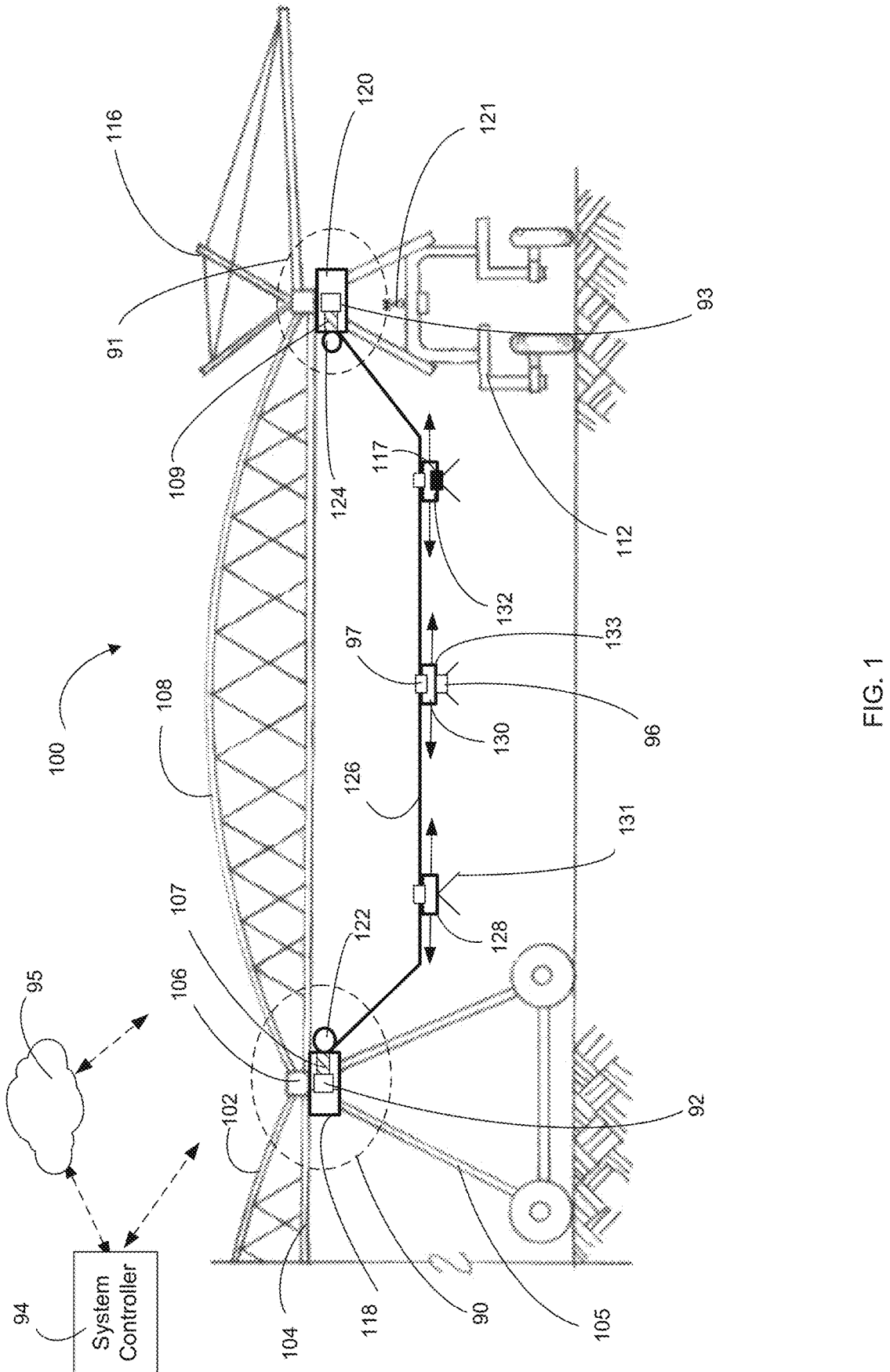
FIG. 1 shows a schematic diagram of an exemplary irrigation system in accordance with a first preferred embodiment of the present invention.

To promote an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one skilled in the art.

In accordance with preferred embodiments of the present invention, it should be understood that the term "drive unit" may preferably include a number of sub-components including a motor, a controller, and a communication device (such as a PLC or the like). While the invention is discussed below with respect to specific exemplary towers, the number of towers used may be expanded or reduced (i.e., 2-100 towers) as needed without departing from the spirit of the present invention. Further, the term "motor" as used herein may refer to any suitable motor for providing torque. Accordingly, the term "motor" as used herein may preferably include motors such as switch reluctance motors, induction motors, transducers and the like.

Where the specification describes the advantages of an embodiment or limitations of other prior art, the applicant does not intend to disclaim or disavow any potential embodiments covered by the appended claims unless the applicant specifically states that it is "hereby disclaiming or disavowing" potential claim scope. Moreover, the terms "embodiments of the invention", "embodiments" or "invention" do not require that all embodiments of the invention include the discussed feature, advantage, or mode of operation, nor that it does not incorporate aspects of the prior art which are sub-optimal or disadvantageous.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Additionally, any examples or illustrations given herein are not to be regarded in any way as restrictions on, limits to, or express definitions of, any term or terms with which they are utilized. Instead, these examples or illustrations are to be regarded as illustrative only.

As used herein, the singular forms "a", "an" and "the" are intended to include the plural forms as well, unless the context clearly indicates otherwise. Additionally, the word "may" is used in a permissive sense (i.e., meaning "having the potential to'), rather than the mandatory sense (i.e., meaning "must"). Further, it should also be understood that throughout this disclosure, unless logically required to be otherwise, where a process or method is shown or described, the steps of the method may be performed in any order (i.e., repetitively, iteratively or simultaneously) and selected steps may be omitted. It will be further understood that the terms "comprises", "comprising", "includes" and/or "including" when used herein, specify the presence of stated features, integers, steps, operations, elements, and/or components, but do not preclude the presence or addition of one or more other features, integers, steps, operations, elements, components, and/or groups thereof.

Further, many of the embodiments described herein are described in terms of sequences of actions to be performed by, for example, elements of a controller. It should be recognized by those skilled in the art that the various sequences of actions described herein can be performed by specific circuits (e.g., application-specific integrated circuits (ASICs)) and/or by program instructions executed by at least one processor to enable the at least one processor to perform the functionality described herein. Furthermore, the sequence of actions described herein can be embodied in a combination of hardware and software. Thus, the various aspects of the present invention may be embodied in a number of different forms, all of which have been contemplated to be within the scope of the claimed subject matter.

Aspects of the systems and methods described herein may be implemented as functionality programmed into any of a variety of circuitry, including: programmable logic controllers (PLCs), programmable logic devices (PLDs), field programmable gate arrays (FPGAs), programmable array logic (PAL) devices, electrically programmable logic and memory devices and standard cell-based devices, as well as application specific integrated circuits (ASICs). Some other possibilities for implementing aspects of the systems and methods includes microcontrollers with memory, embedded microprocessors, firmware, software, and the like.

With reference now to FIGS. 1-6, exemplary cable and trolley designs for use within a mechanized irrigation system shall now be discussed. The present invention is discussed with respect to example irrigation systems. It should be understood that the example irrigation systems discussed are intended to be purely illustrative and that any of a number of irrigation system types could be used to implement the features of the present invention. Accordingly, any number of different irrigation machine designs (i.e., fixed, center pivot, linear, corner, benders) and components (i.e., steerable drive units, corner drive units, linear drive systems) may be used with the present invention without limitation.

With reference now to FIG. 1, a schematic diagram of an exemplary irrigation system in accordance with a first preferred embodiment shall now be discussed. As shown in FIG. 1, an exemplary irrigation machine 100 of the present invention preferably may include a number of irrigation spans 102, 108 supported by a truss system 104 and connected at one or more connection points 106. The exemplary irrigation machine 100 may also include a number of drive towers which may include conventional drive units/towers 105 and steerable drive units/towers 112. The system may also include a boom 116 and an end gun (not shown) and/or other sprayers. Additionally, one or more position sensors 121 may provide positional and angular orientation data for the system.

As shown in FIG. 1, the present invention preferably includes the use of a cable and trolley system which is attached to the components of the irrigation machine. According to a first preferred embodiment, the attached cable and trolley system of the present invention preferably includes one or more trolleys 128, 130, 132 which are designed to run along one or more transport cables 126 attached between spans and/or drive towers 105, 112 of the present invention. Elements of the present invention may alternatively be attached between various other irrigation machine elements such as a center pivot structure, the truss, the spans, etc. without limitation.

As discussed further below, the cable system 126 may include a group of cables that may provide individual, lateral movement for each trolley via a winch/drive mechanism attached to the cable 126. Alternatively, groups of trolleys may be attached to common wires which move the trolleys together. According to alternative preferred embodiments, the attached winch/drive mechanisms may be attached to one or both ends of the cable 126. Further, a single end may be spring-loaded by a torsion spring or the like and the second end may be driven by the winch/drive mechanism. Alternatively, each trolley may move using internal piezo-electric motors or the like.

According to preferred embodiments, the trolleys 128, 130, 132 of the present invention may preferably include sprayers 131 to allow each trolley 128, 130, 132 to apply applicants to targeted areas of a given crop/field. To perform this function, each trolley may include an internal reservoir 133 which may include concentrated applicants that may be sprayed directly from the trolley and/or mixed with water or other applicants provided to the trolley via tubing internal to the cable 126 (discussed below) or another tubing system independent of the cable 126. According to further preferred embodiments, each trolley of the present invention may include a trolley controller 97 and one or more sensing devices 117 which may be cameras and/or thermal, infrared imagers/sensors to detect crop status, health, temperature and the like. Each trolley may further include other sensors such as proximity sensors 96 or the like to determine the distance between a given trolley and the ground, a crop height, and/or another trolley or drive tower. According to a further preferred embodiment, each trolley may independently use such sensors to target and selectively apply applicants to a given crop or individual plants based on detected conditions. In spraying operations, the trolleys may be moved together while the individual trolleys may be individually activated to spray given targeted areas.

In the example shown, the cable/trolley system 100 of the present invention may preferably be driven by one or more motor assemblies 90, 91 which preferably include motor/ drive/winch systems 107, 109 under the control of one or more motor controllers 92, 93. According to a preferred embodiment, such drive systems 107, 109 may be built within or attached to attachment/winding structures 118, 120 for storing and/or securing the cable 126 to the structure of the irrigation machine. In the example shown, the first winding structure 118 is shown attached to a first drive tower 105 and the second winding structure 120 is shown attached to a second drive tower 112. As shown, a first lateral arm 122 may be used to support and position the driving cables 126 to allow for the positioning inputs provided by the motor/drive/winch systems 107, 109 of the present invention. As discussed further below, preferably the first lateral arm 122 may include one or more pulleys to be used for mechanical advantage in retracting or extending the cable 126 by the drive system 107. At the other end, a second lateral arm 124 may be used to support and position the driving cables 126 of the present invention to allow for the positioning inputs provided by the drive systems 107, 109 of the present invention. As with the first lateral arm 122, the second lateral arm 124 may preferably include one or more pulleys to be used for mechanical advantage in retracting or extending the cable 126 by the drive system 109.

By means of the coordinated retraction and extension of the cable 126, the trolleys 128, 130, 132 of the present invention may preferably travel back and forth to cover the area underneath the span 108. According to a further preferred embodiment, the system may allow for height adjustments by adjusting the cable tension. According to a further preferred embodiment, one or more trolleys may include controllers 134 and proximity/distance sensors 96 which may determine the distance between the trolley and a given field or crop. Such proximity/distance sensors may then transmit the sensed distances to trigger real-time height adjustments as the irrigation system 100 travels across a given field. As discussed further herein, the trolleys may move laterally both by the movement of a given transport cable and by an independent motor system of the trolley itself. The system controller 94 and a given trolley controller 97 may coordinate the movements and target locations of a given trolley so that large movements may be conducted by the movement of the transport cable 126, while smaller movements may be conducted independently by the trolley.

Figure 2:
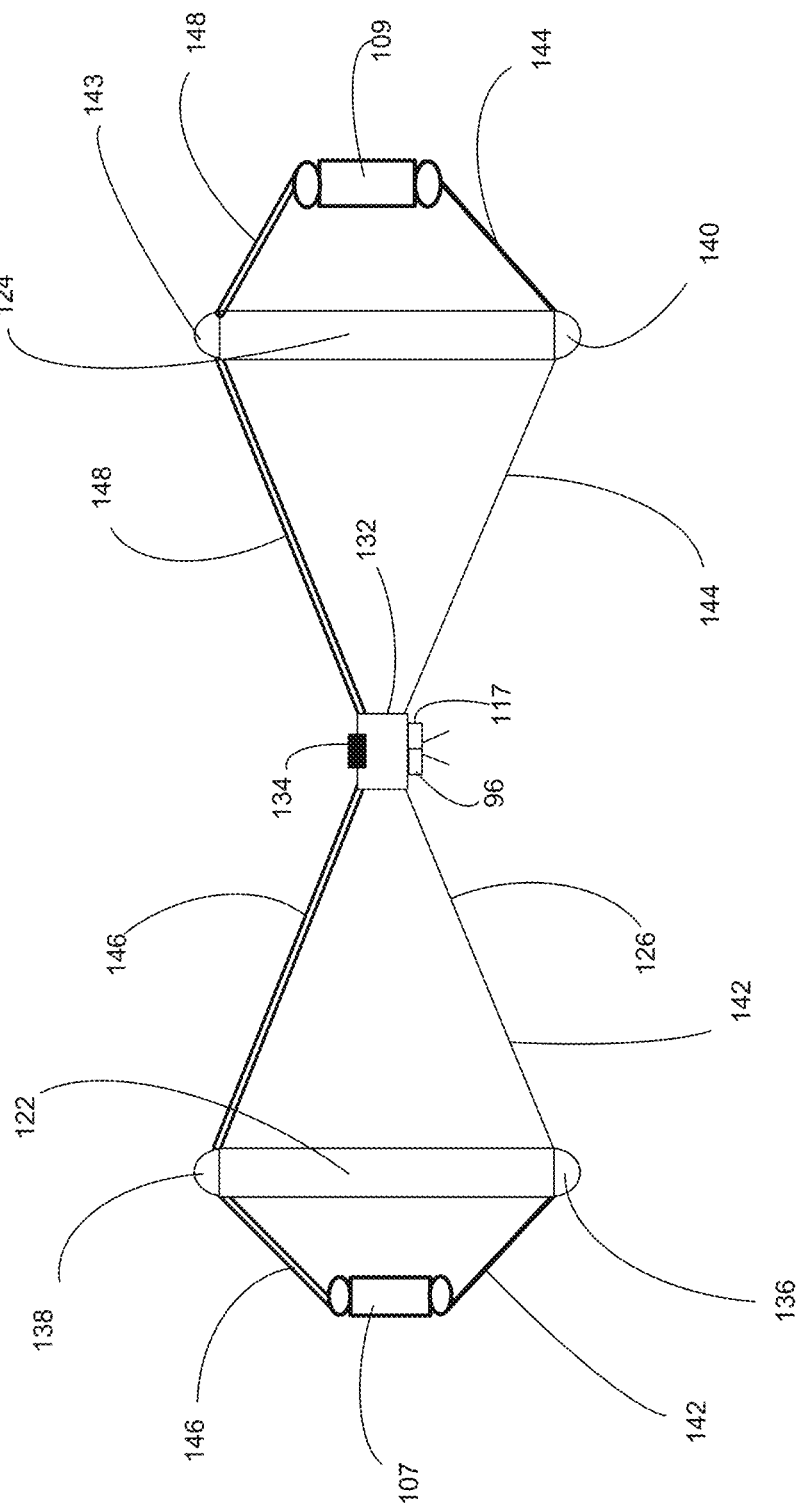
FIG. 2 shows a top-down plan view of an exemplary irrigation system in accordance with a preferred embodiment of the present invention.

Referring now to FIG. 2, an overhead plan view of the exemplary preferred embodiment shown in FIG. 1 arranged with a single trolley 132 is provided. As shown in FIG. 2, the exemplary trolley 132 is supported/suspended between the first lateral arm 122 and the second lateral arm 124. Additionally, the first motor/winch 107 for retracting and extending attached cables 142, 146 is shown. Specifically, the first motor/winch 107 is shown mechanically attached to a first supporting coax cable 146. In operation, the first motor/winch 107 at a first end preferably extends and retracts the coaxial cable 146 in response to control signals in concert with one or more other motors/winches 109. As shown, the first supporting coax cable 146 preferably may extend from the first motor/winch 107 through one or more pulleys 138 to attach to the suspended trolley 132. Additionally, the first motor/winch 107 is shown mechanically attached to a second cable 142. In operation, the first motor/winch 107 may preferably extend and retract the second cable 142 in response to control signals in concert with the movement of the first supporting coax cable 146 and one or more other motors/winches 109 as discussed further below. As shown, the second cable 142 preferably may extend from the first motor/winch 107 through one or more pulleys 136 to attach to the suspended trolley 132.

At the second lateral arm 124, the second motor/winch 109 may preferably be positioned to retract and extend attached cables 144, 148 as shown. Specifically, the second motor/winch 109 is shown mechanically attached to a second supporting coax cable 148 and a second standard cable 144. In operation, the second motor/winch 109 preferably extends and retracts the coaxial cable 148 in response to control signals in concert with the other motor/winches of the present invention. As shown, the second supporting coax cable 148 preferably may extend from the second motor/winch 109 through one or more pulleys 143 to attach to the suspended trolley 132. Additionally, the second motor/winch 109 is preferably mechanically attached to a second standard cable 144. In operation, the second motor/winch 109 preferably may extend and retract the second standard cable 144 in response to control signals in concert with the movement of the second supporting coax cable 148 and one or more other motors/winches as discussed further herein. As shown, the second standard cable 144 preferably may extend from the second motor/winch 109 through one or more pulleys 140 to attach to the suspended trolley 132.

Figure 3:
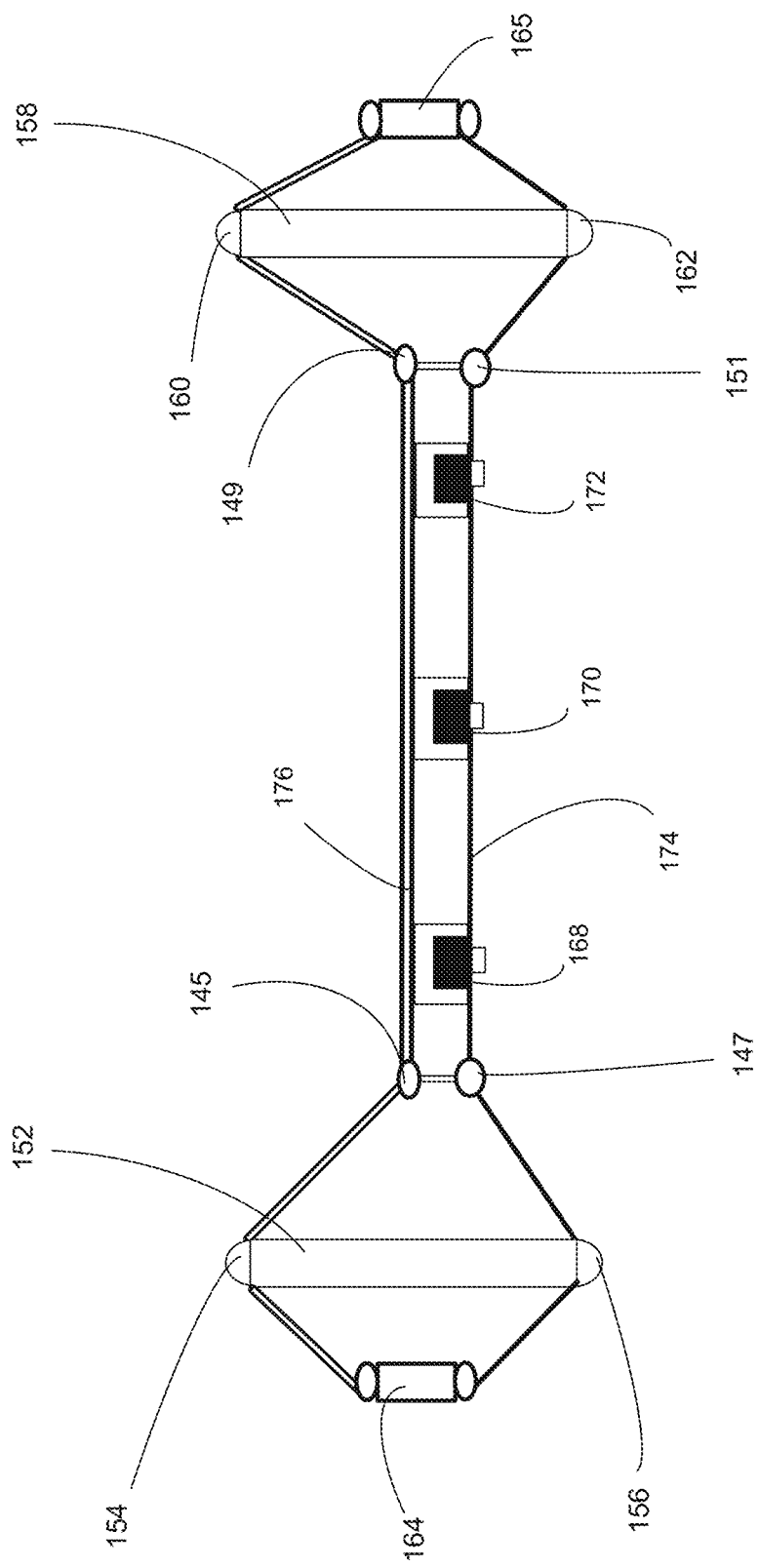
FIG. 3 shows a top-down plan view of an exemplary irrigation system in accordance with a further preferred embodiment of the present invention.

Referring now to FIG. 3, an overhead plan view of the exemplary preferred embodiment shown in FIG. 1 arranged with multiple trolleys 168, 170, 172 is provided. As shown in FIG. 3, the exemplary trolleys 168, 170, 172 are supported/suspended between the first lateral arm 152 and the second lateral arm 158. As discussed above with respect to FIG. 2, the multiple trolleys 168, 170, 172 are shown supported by a first coaxial cable 176 and a standard cable 174. The first lateral arm 152 preferably may include pulleys 154, 156 to allow the extension and retraction of the suspended cables 174, 176 via a first motor/winch 164. Similarly, the second lateral arm 158 preferably may include pulleys 160, 162 to allow for the extension and retraction of the suspended cables 174, 176 via a second motor/winch 165.

As shown, the first supporting coax cable 176 is preferably attached at a first end to the first motor/winch 164. The coax cable 176 may then proceed around the first pulley 154, through one or more alignment pulleys/sheaves 145, and through the attached suspended trolleys 168, 170, 172. The coax cable 176 may then further extend through a second alignment pulley/sheave 149, around a second pulley 160 to the second motor/winch 165. The first motor/winch 164 and the second motor/winch 165 may preferably extend and retract the coax cable 176 in a coordinated and complementary fashion to laterally move and position the trolleys 168, 170, 172 in response to control signals generated by the system.

As further shown, the standard cable 174 preferably may attach at a first end to the first motor/winch 164 and then may extend around a first pulley 156, through one or more alignment pulleys/sheaves 147, through the attached suspended trolleys 168, 170, 172. The standard cable 174 may then preferably further extend through a second alignment pulley/sheave 151, around a second pulley 162 to the second motor/winch 165. The first motor/winch 164 and the second motor/winch 165 may preferably extend and retract the standard cable 174 in a coordinated and complementary fashion to laterally move and position the trolleys 168, 170, 172 in sync with the movements of the coax cable 176.

As discussed above, the central trolleys 168, 170, 172 preferably may be laterally moved in response to the coordinated extension and retraction of the standard cable 174 and the coaxial cable 176. Preferably, the extension and retraction of the respective cables 174, 176 is done in a coordinated fashion to move the central trolleys 168, 170, 172 over a given area to be monitored and/or irrigated. Such movement may be directed by the commands of a given irrigation prescription plan executed by the system controller 94. The system controller 94 may directly provide commands to individual trolleys and other system elements. Alternatively, commands may be provided remotely via a remote server arrangement/cloud 95.

Independent of commands from the system controller 94, one or more of the central trolleys 168, 170, 172 may function autonomously in response to sensed conditions. For example, the sensors and control systems of one or more of the central trolleys 168, 170, 172 may monitor/detect given crop or field conditions. Once specific crop and/or field conditions are detected, the trolley controller(s) may independently move the trolleys to a given location and initiate a sensor scan and/or treatment application. Still further, the trolley controllers may preferably also be configured to direct the system controller 94 (and/or the winch/drive mechanisms 164, 165 directly) to move the trolleys 168, 170, 172 at least in part with the transport cables to a given target location.

Figure 4:
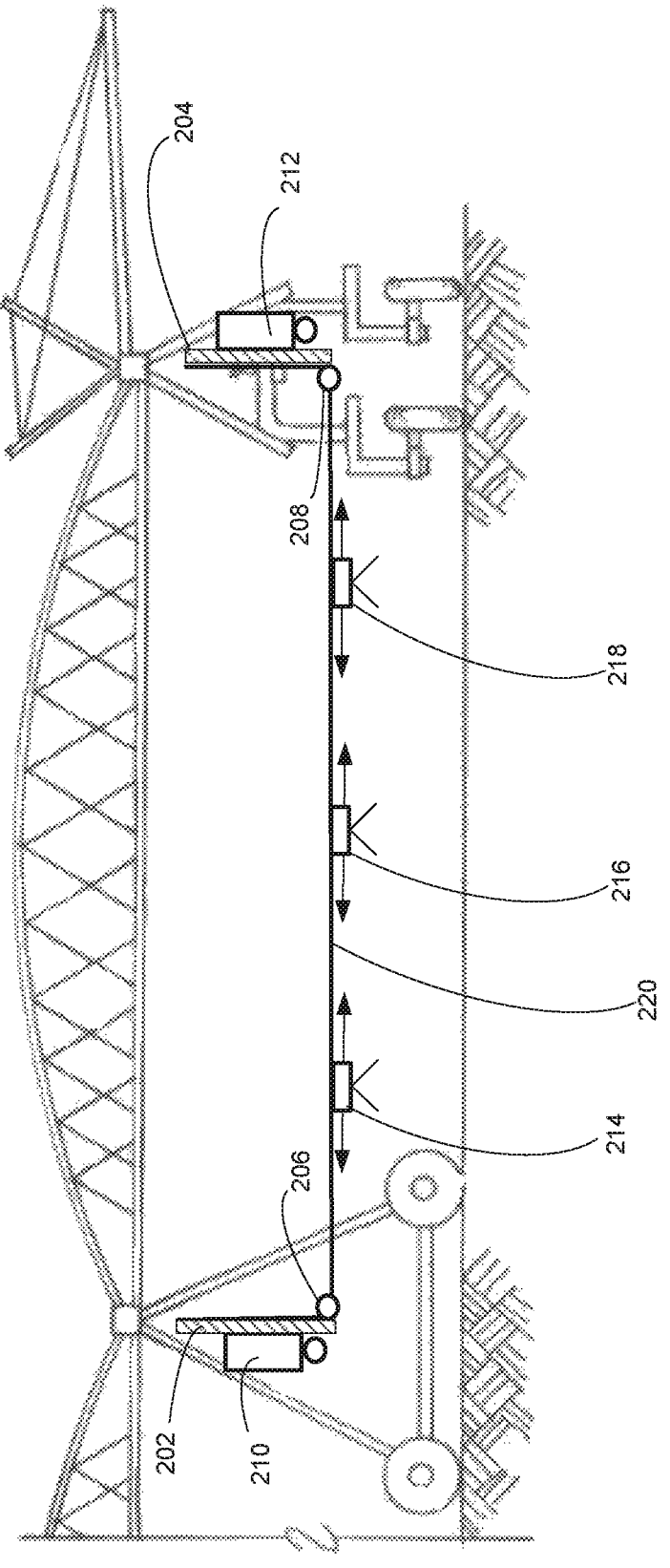
FIG. 4 shows a schematic diagram of an exemplary irrigation system in accordance with a second preferred embodiment of the present invention.

Referring now to FIG. 4, the system of the present invention may include a rigid attachment structure 202, 204 which may hold the cable(s) 220 of the present invention under tension at a specific height. According to alternative preferred embodiments, the attachment structure(s) 202, 204 may be formed of adjustable pipe sections which may be raised and lowered according to crop heights and the like. Such adjustments may be made manually or automatically and may be initiated by the system controller 94 or by a trolley controller 97.

As discussed above, the attached trolleys 214, 216, 218 may be moved together or independently to target specific areas for treatment beneath the span 108. As shown in FIG. 4, the exemplary cable 220 may extend from a motor/winch 210 and through an attached lateral arm 206 to attach to the irrigation trolleys 214, 216, 218. The cable 220 may then preferably extend through a second lateral arm 208 to a second motor/winch 212. As discussed above, the exemplary cable 220 may represent a single cable or may be multiple cables for individually suspending and driving the suspended trolleys 214, 216, 218. Further, the system shown in FIG. 4 may preferably include the pulley, sheave, coaxial cable, and standard cable elements discussed above with respect to FIGS. 1-3.

Figure 5:
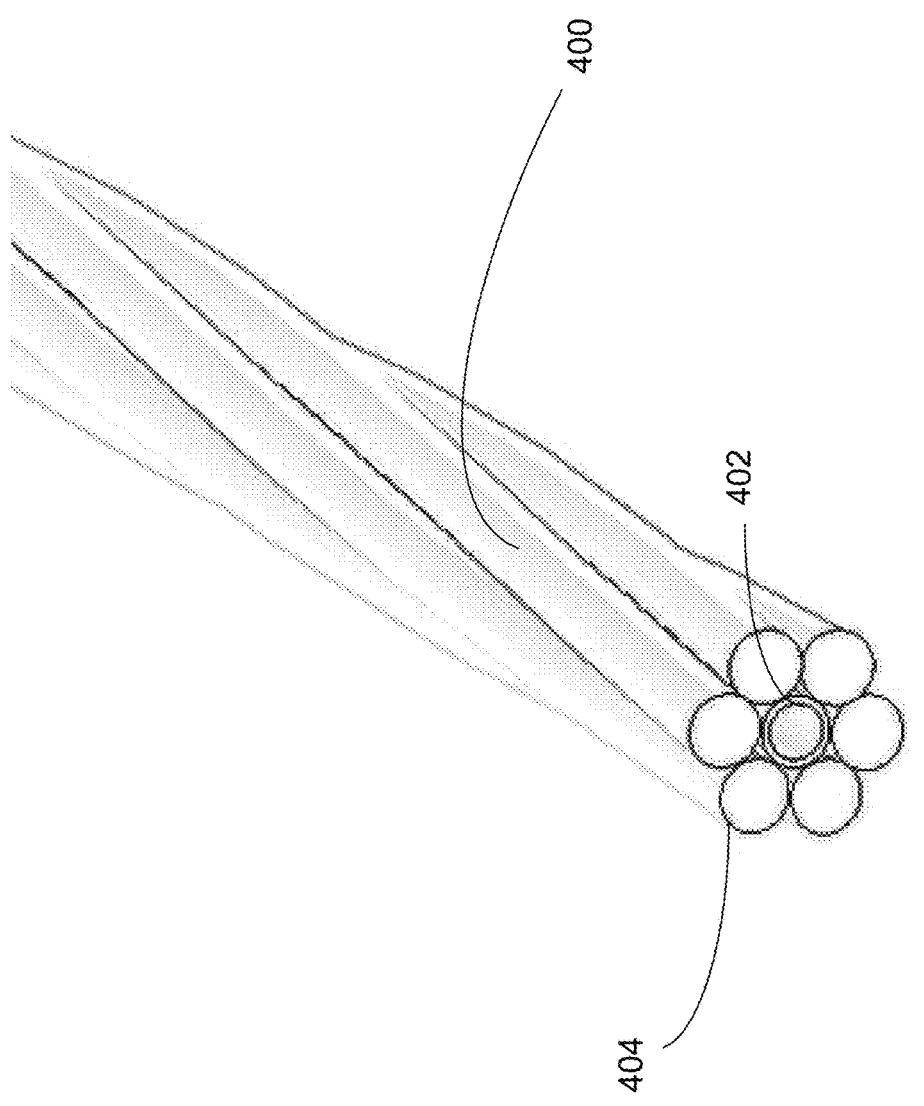
FIG. 5 shows an illustration of an exemplary coaxial cable design in accordance with further aspects of the present invention.
Figure 6:
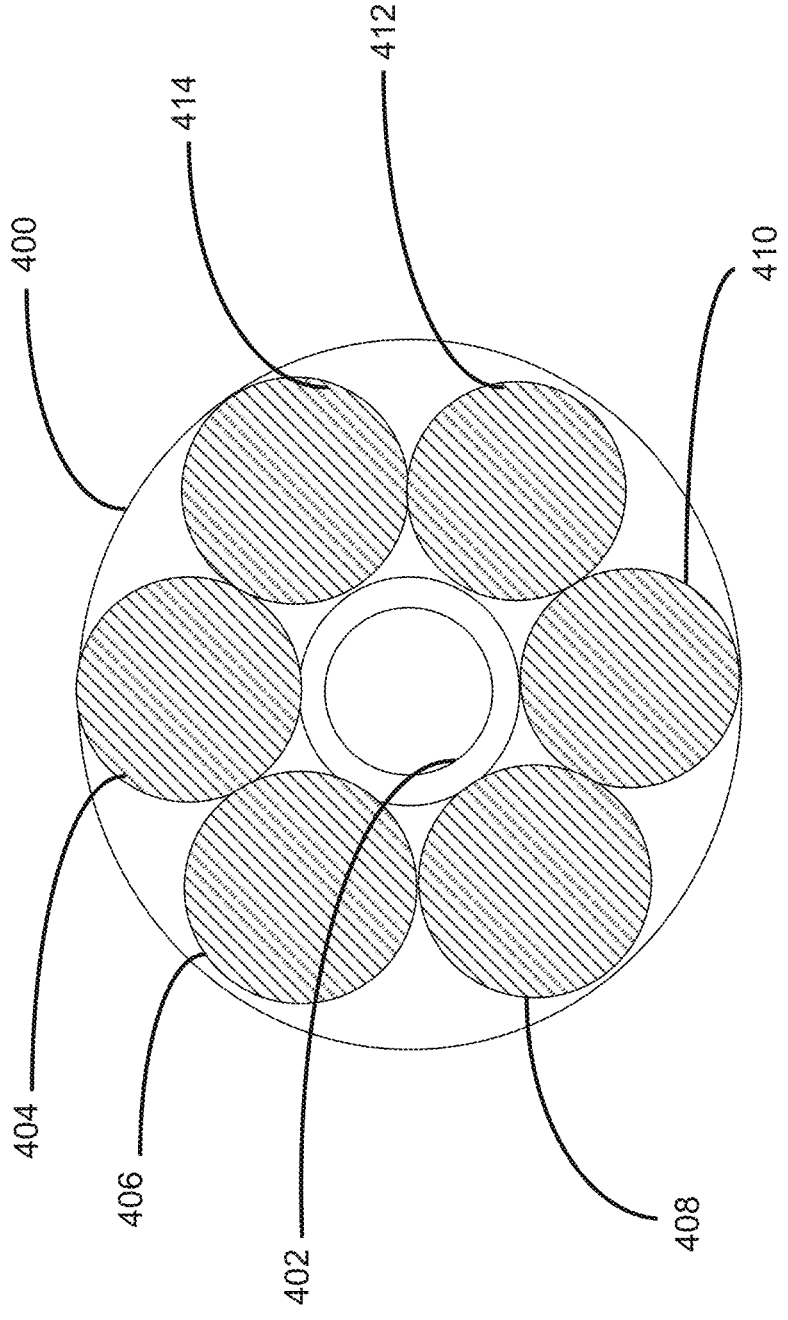
FIG. 6 shows a cross-sectional view of the exemplary coaxial cable design shown in FIG. 5.

Referring now to FIG. 5, an exemplary cable design 400 in accordance with further aspects of the present invention shall now be discussed. As shown in FIG. 5, one or more cables 400 of the present invention may be formed as braided cable with multiple, individual cable braids 404 combined to form a single braided cable 400. According to an exemplary preferred embodiment, the braided cable 400 of the present invention may preferably further include one or more central irrigation tubes 402. According to a first preferred embodiment, central tubing 402 of the present invention may preferably be formed of PVC, nylon or the like. The central tubing 402 may preferably be hollow to allow fluids to flow through it while still allowing for the structural needs of a cable 400. The one or more central tubes 402 may also be used to run specific wires/cables to run electronics (i.e., valves, cameras, etc.). For example, a central tube 402 may be used to run coaxial cable or the like. According to further alternative embodiments, multiple central tubes 402 may be provided within the cable to allow for a variety of control, power, sensor and irrigation lines to be run together. FIG. 6 provides a cross-sectional view of the exemplary cable 400. As shown, the central irrigation tubing 402 is surrounded by a group of braided cables 404, 406, 408, 410, 412, 414.

While the above descriptions regarding the present invention contain much specificity, these should not be construed as limitations on the scope, but rather as examples. Many other variations are possible. For example, the systems of the present invention may be used with any arrangement of drive towers including both linear and center pivot systems. Further, As discussed above, each cable of the present invention may be formed of a single cable or may include multiple cables for individually suspending and driving trolleys. Still, further, each feature of the present invention may be made to be remotely activated and accessed from distant monitoring stations. Accordingly, data may preferably be uploaded to and downloaded from the present invention as needed.

Accordingly, the scope of the present invention should be determined not by the embodiments illustrated, but by the appended claims and their legal equivalents.

What is claimed is:

1. A system for providing irrigation to targeted areas beneath an irrigation machine, wherein the irrigation machine comprises a first drive tower, a central span, and a second drive tower, the system comprising:

a first motor assembly, wherein the first motor assembly comprises a first motor, a first motor controller and a first winding structure;

a first lateral arm assembly, wherein the first lateral arm assembly comprises a first lateral arm section, a first end pulley and a second end pulley;

a second motor assembly, wherein the second motor assembly comprises a second motor, a second motor controller and a second winding structure;

a second lateral arm assembly, wherein the second lateral arm assembly comprises a second lateral arm section, a third end pulley and a fourth end pulley;

a first transport cable; wherein the first transport cable is attached at a first end to the first motor assembly and at a second end to the second motor assembly;

a second transport cable; wherein the second transport cable is attached at a third end to the first motor assembly and at a fourth end to the second motor assembly;

a first trolley; wherein the first trolley is attached to the first transport cable and the second transport cable; and a system controller; wherein the system controller is configured to transmit control signals to the first motor controller and the second motor controller to laterally position the first trolley at a first target location between the first drive tower and the second drive tower.

2. The system of claim 1, wherein the first transport cable comprises a first braided cable.

3. The system of claim 2, wherein the first braided cable comprises a plurality of cables.

4. The system of claim 3, wherein the braided cable further comprises a central tube.

5. The system of claim 4, wherein the central tube comprises a hollow PVC tube configured to allow for the transport of an applicant.

6. The system of claim 5, wherein the first motor assembly comprises a first winch.

7. The system of claim 6, wherein the second motor assembly comprises a second winch.

8. The system of claim 2, wherein the system controller is configured to transmit control signals to increase the length of one or more transport cables to adjust the vertical distance between the first trolley and a first crop.

9. The system of claim 8, wherein the vertical distance between the first trolley and the first crop is adjusted by the tension in one or more transport cables.

10. The system of claim 9, wherein the first trolley comprises a proximity sensor which is configured to produce proximity data.

11. The system of claim 10, wherein the system controller is configured to use the proximity data produced by the proximity sensor to adjust the vertical distance between the first trolley and the first crop.

12. The system of claim 11, wherein the first trolley comprises a first motor; wherein the first trolley is self-propelled.

13. The system of claim 12, wherein the first trolley comprises a first trolley controller.

14. The system of claim 13, wherein the first trolley controller is in communication with the system controller.

15. The system of claim 14, wherein the system controller is configured to determine a second target location.

16. The system of claim 15, wherein the first trolley comprises an imager; wherein the imager is configured to produce image data.

17. The system of claim 16, wherein the first trolley is configured to analyze imaging data and determine an indication of crop status.

18. The system of claim 17, wherein the system controller is configured to determine the second target location at least in part on the image data detected by the imager.

19. The system of claim 18, wherein the system controller is configured to transmit a first set of target instructions to the first motor controller and to the first trolley controller.

20. The system of claim 19, wherein the first trolley is moved to the second target location based at least in part on the movement of the first transport cable, and at least in part based on the independent movement of the first trolley.

21. The system of claim 20, wherein the system comprises a second trolley; wherein the first trolley and the second trolley are configured to move together at a set distance apart.

22. The system of claim 20, wherein the first trolley and the second trolley are configured to independently spray an applicant to a plurality of target locations.

23. The system of claim 21, wherein the first trolley and the second trolley are configured to independently adjust the distance between the first trolley and the second trolley.

\* \* \* \* \*